United States Patent [19]
Guinan et al.

[11] Patent Number: 5,816,042
[45] Date of Patent: Oct. 6, 1998

[54] FLOW DIVERTER SYSTEM FOR MULTIPLE STREAMS FOR GAS TURBINE ENGINES

[75] Inventors: Daniel P. Guinan; David E. Wendt, both of Hobe Sound, Fla.

[73] Assignee: United Technologies Corporation, Hartford, Conn.

[21] Appl. No.: 773,586

[22] Filed: Dec. 27, 1996

[51] Int. Cl.⁶ .................................................. F02K 3/04
[52] U.S. Cl. .............................. 60/226.1; 60/229; 60/266
[58] Field of Search ................................ 60/226.1, 226.2, 60/226.3, 229, 230, 266; 237/265.25, 265.27, 265.29, 265.33

[56] References Cited

U.S. PATENT DOCUMENTS

| | | | |
|---|---|---|---|
| 3,190,584 | 6/1965 | Gire et al. ................................. | 60/229 |
| 5,082,209 | 1/1992 | Keyser ................................. | 239/265.25 |
| 5,209,432 | 5/1993 | Roberge et al. ................... | 239/265.27 |
| 5,297,388 | 3/1994 | Nightingale ................................. | 60/230 |

*Primary Examiner*—Louis J. Casaregola
*Attorney, Agent, or Firm*—Norman Friedland

[57] ABSTRACT

A flow diverting mechanism for the twin duct offtakes or coannular offtake for a turbo fan engine powering aircraft with either thrust reversing or short takeoff and vertical landing or both capabilities includes a rotary drum mounted between the turbine and afterburner sections and includes ports complementing the inlets in the offtakes to divert the core stream through the offtakes and passages to proportion the fan discharge air utilized for cooling purposes in the engine to cool the liner and walls of the offtakes and the engine components located downstream of the rotary drum while assuring separation of the core stream flow and fan air flow.

8 Claims, 11 Drawing Sheets

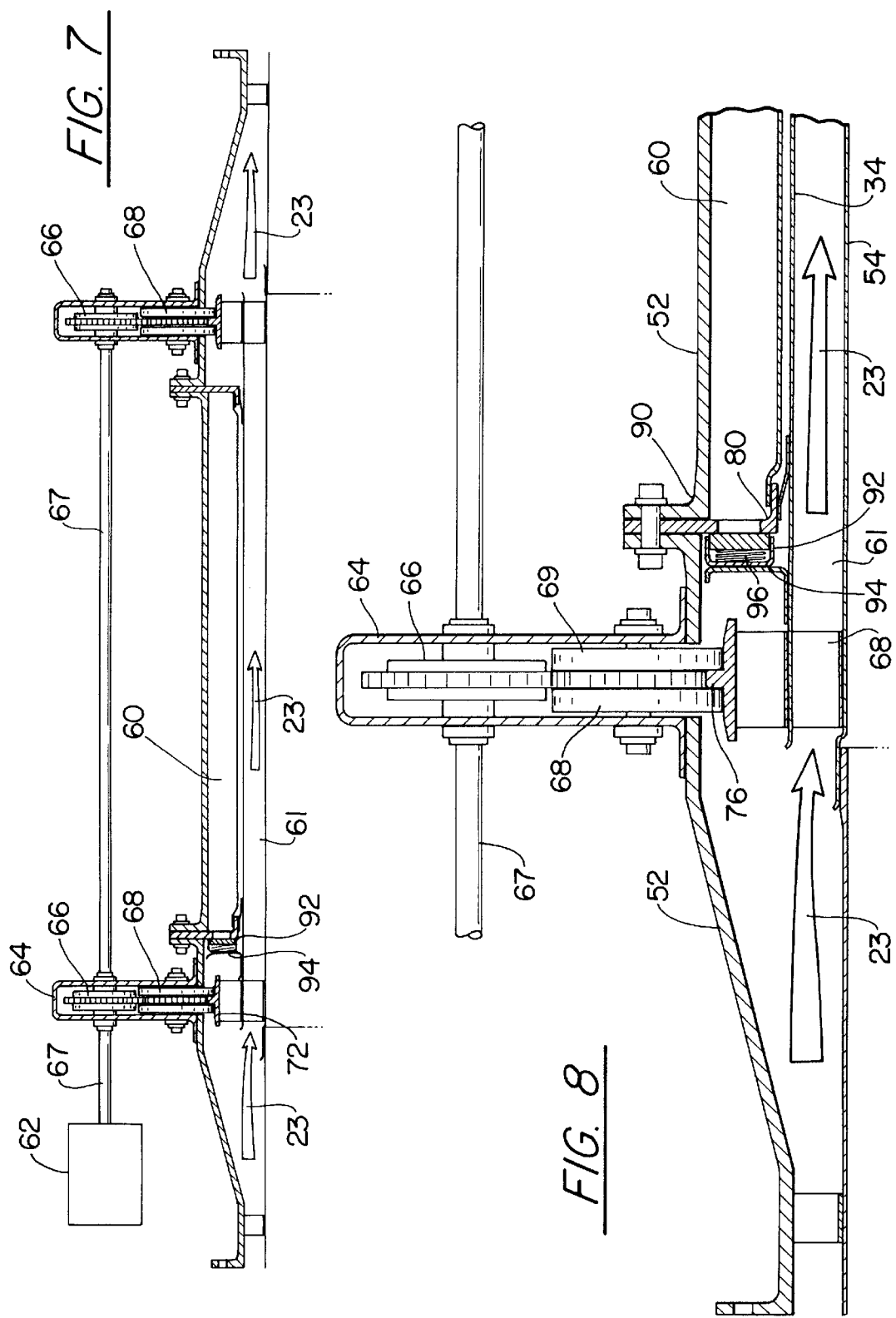

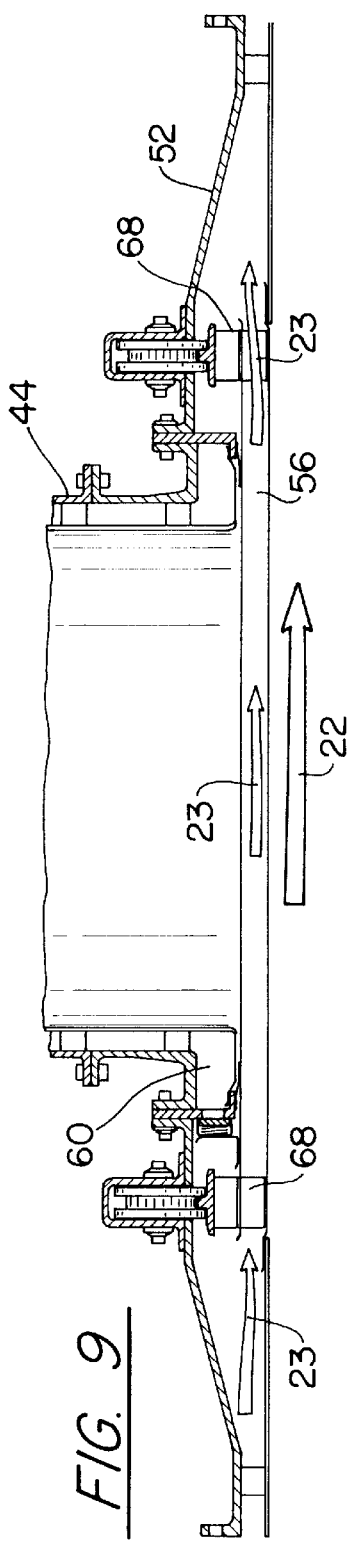
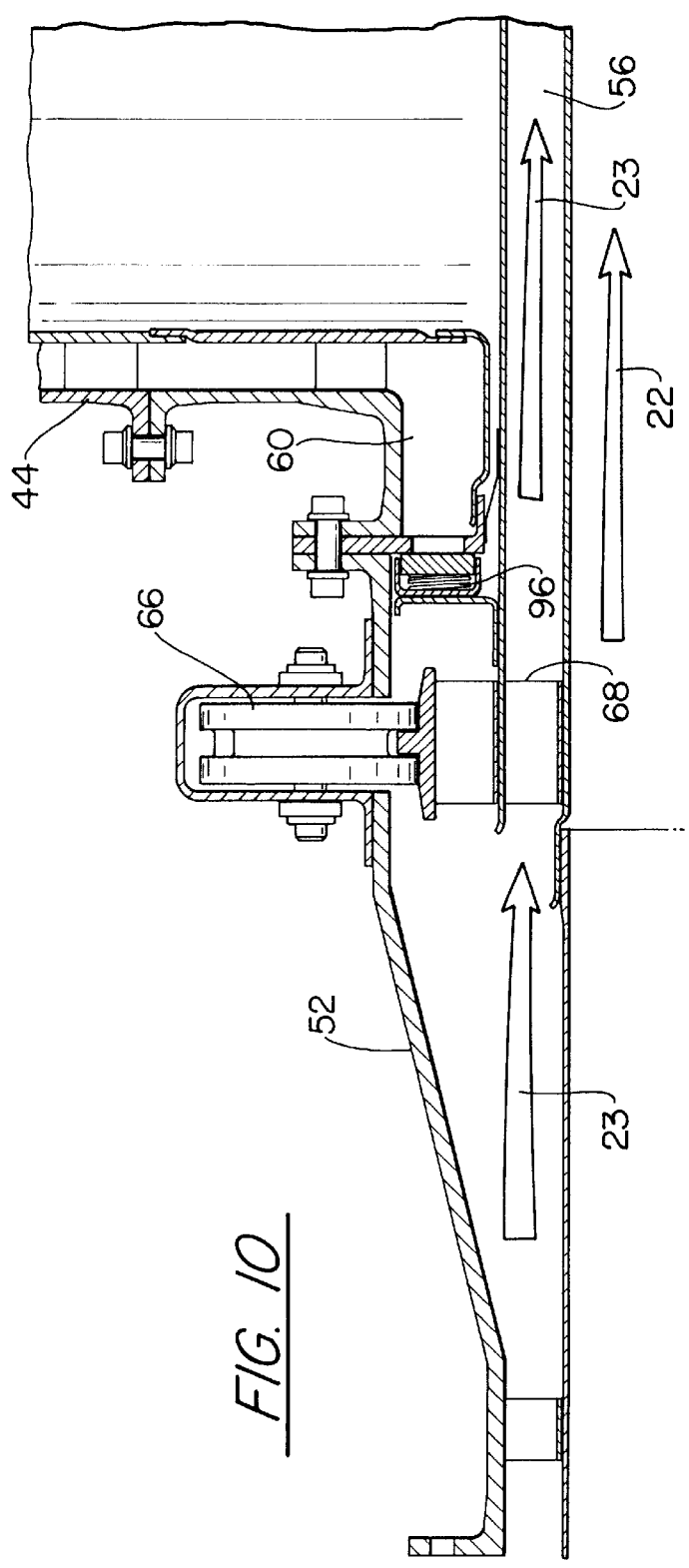

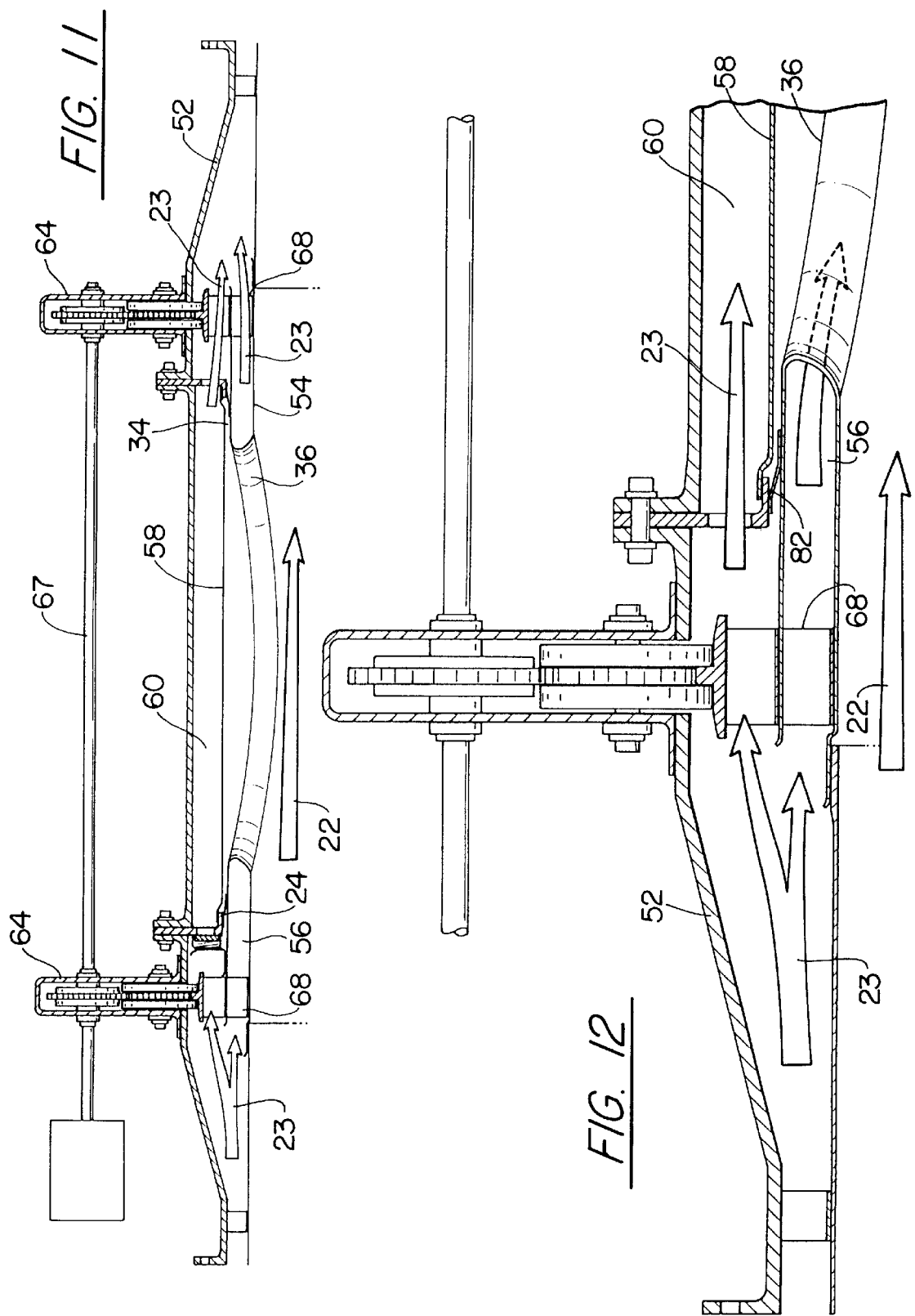

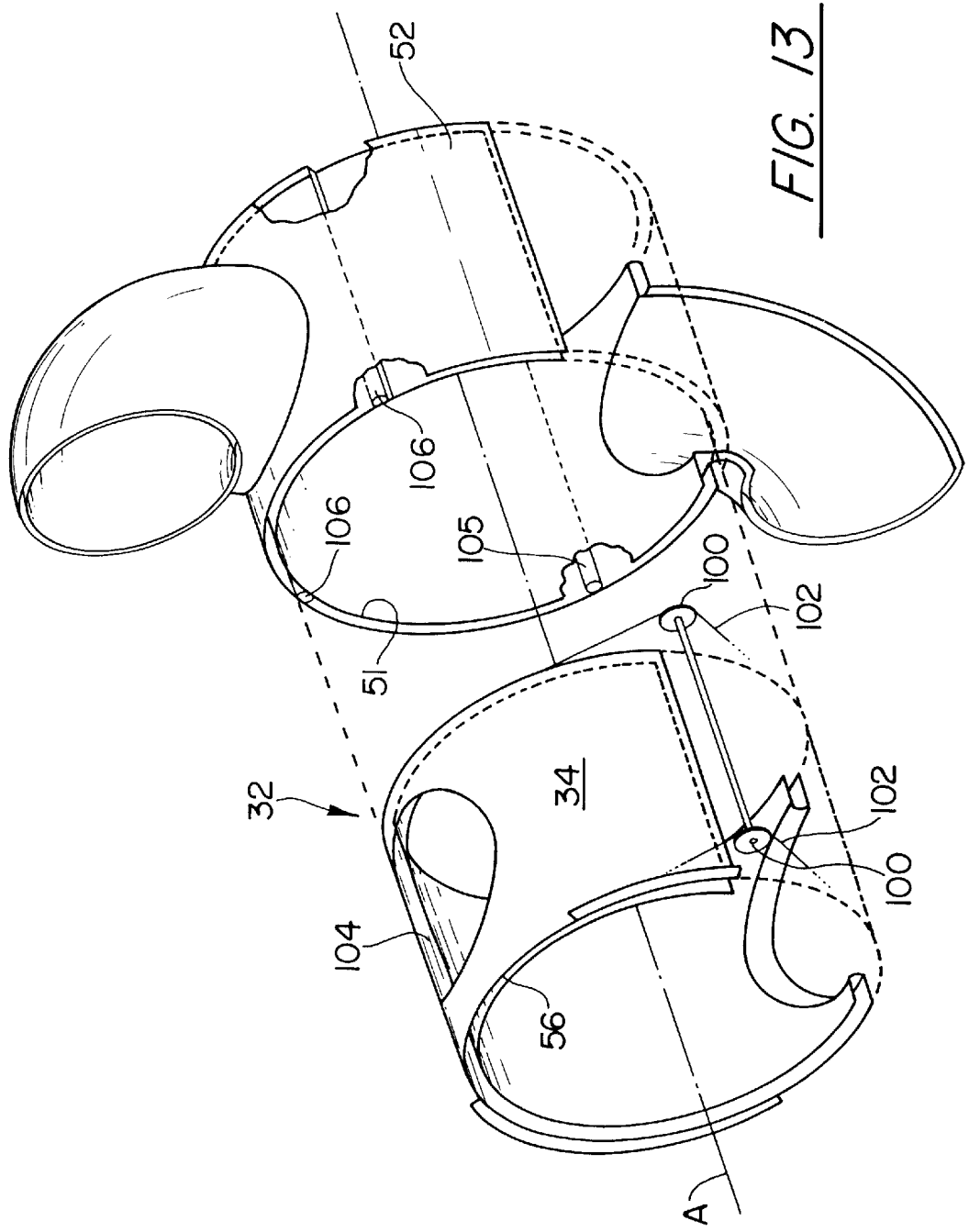

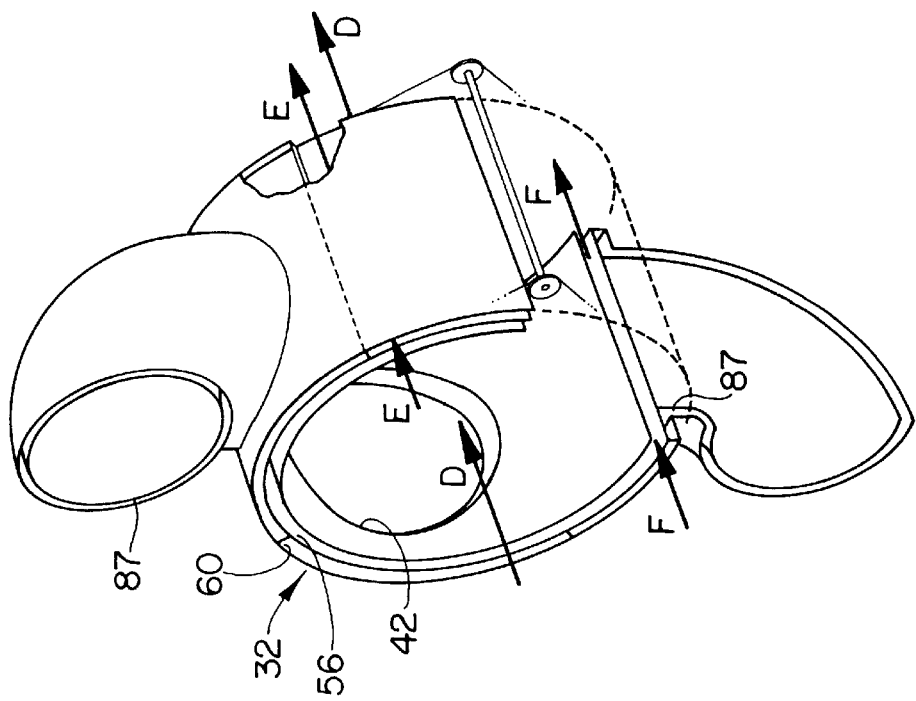
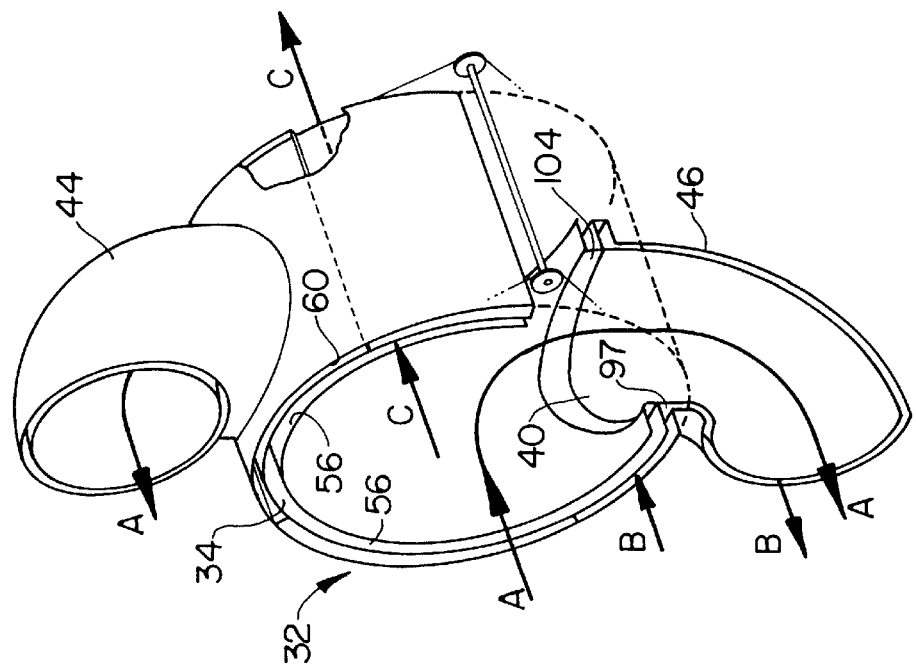

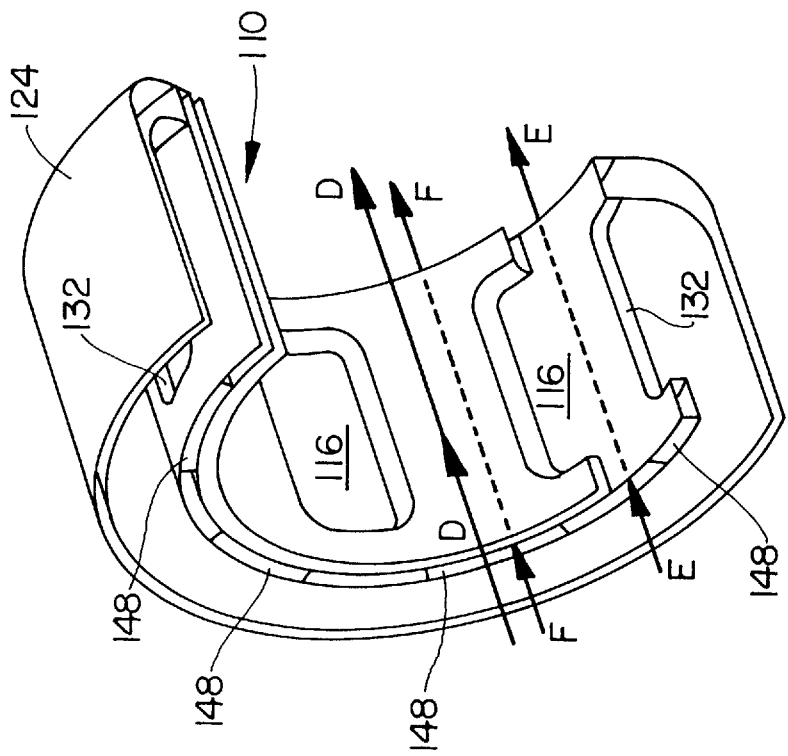
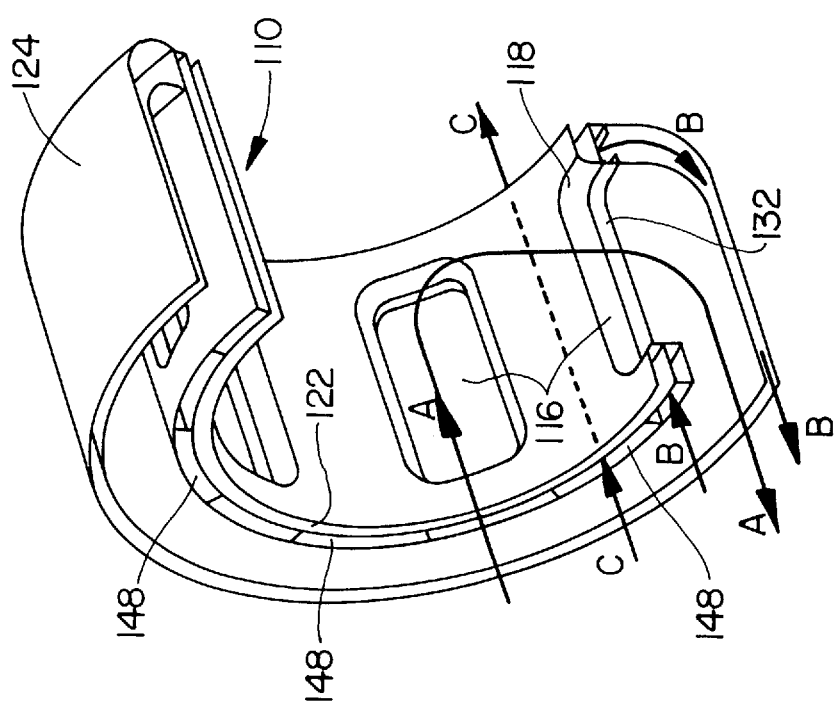

FLOW DIVERTER SYSTEM FOR MULTIPLE STREAMS FOR GAS TURBINE ENGINES

TECHNICAL FIELD

This invention relates to gas turbine engines for powering aircraft and particularly to means for vectoring the thrust by controlling the direction of the core stream and the fan stream without mixing the two streams. Full closure of the engine's working medium through the exhaust nozzle is independently provided for.

BACKGROUND ART

As is well known in the gas turbine engine technology, because of the advent of high speed, high performance and thrust vectoring engines for military use, the goal of the designer is to assure that the engine performance is maintained at a high efficiency level, the weight of the engine and its component parts are held to a minimum and the engine architecture and hardware is not complex. The industry has seen a plethora different concepts for converting the gas turbine engine utilizing today's technology to perform short and vertical take-offs and landings (STOVL). For example, the Harrier aircraft which has short takeoff and vertical lift capabilities has been in service for several years. However, none of these structures or systems function with the separation of the core and fan flow when in the STOVL mode of operation.

For example U.S. Pat. No. 5,098,022 granted to Thayer on Mar. 24, 1992 and entitled "Flow Diverting Nozzle For A Gas Turbine Engine" discloses a gas turbine engine vertical thrust nozzles that diverts the engine's core stream to provide vertical or a combination of vertical and forward thrust. This mechanism is located in the up stream end of the afterburner.

U.S. Pat. No. 5,082,209 granted to Keyser on Jan. 21, 1992 entitled "Thrust Reverser Assembly" relates to a rotating drum type of configuration to divert the core stream to obtain thrust reversing.

Other patents of interest are U.S. Pat. No. 4,482,107 granted to Metz on Nov. 13, 1984 entitled "Control Device Using Gas Jets For Guided Missile", U.S. Pat. No. 4,552,309 granted to Szuminski et al on Nov. 12, 1985 entitled "Variable Geometry Nozzles For Turbomachinery", and U.S. Pat. No. 4,805,401 granted to Thayer et al on Feb. 21, 1989 entitled "Control Vent For Diverting Exhaust Nozzle".

This invention contemplates the use of valving structure and ducting that serve to separate the fan stream and core stream when the aircraft is placed in the STOVL condition. In accordance with this invention a rotating drum having a cylindrical shell with apertures adapted to communicate with an offtake for valving the core and flow streams in the STOVL operation mode is disposed between the turbine section and afterburner of the gas turbine engine (turbo fan) of the type that includes mechanism for fully closing the exhaust nozzle. The offtake may be a twin duct or coannular configuration. The system is designed so that a portion of the fan air which is typically utilize to cool the hot components of the engine continues to maintain cooling requirements both for the offtake structure and the engine's downstream components such as the exhaust nozzle when the aircraft is in the STOVL operating condition.

SUMMARY OF THE INVENTION

The object of this invention is to provide an improved turbo fan engine structure for providing STOVL or thrust reversing operations for aircraft.

A feature of this invention is to provide a rotating shell and cooperating ducting to selectively change the direction of the core engine flow to obtain STOVL aircraft operation or thrust reversing and concomitantly change the direction of the fan air while directing a portion of the fan air to be utilized downstream of the rotating shell to cool the hot engine components downstream thereof and the offtake structure. The rotating shell valve separate core engine air flow and the fan discharge air flow to obtain the STOVL or thrust reversing operation.

A feature of this invention is that the separate core flow and fan flow feature of this invention can be utilized in various offtakes including a STOVL coannular offtake or a STOVL twin duct offtake.

The foregoing and other features of the present invention will become more apparent from the following description and accompanying drawings.

BRIEF DESCRIPTION OF DRAWINGS

FIG. 7 is a section taken along lines 7—7 of FIG. 4;

FIG. 8 is an enlarged sectional partial view of FIG. 7;

FIG. 9 is a sectional view taken along lines 9—9 of FIG. 3;

FIG. 10 is an enlarged sectional partial view of FIG. 9;

FIG. 11 is a sectional view taken along lines 11—11 of FIG. 3;

FIG. 12 is an enlarged sectional partial view of FIG. 11;

FIG. 13 is an exploded view in schematic of the rotary drum and twin duct offtake;

FIG. 14 is a schematic view in perspective of the rotary drum/twin duct offtake of FIG. 13 illustrating the STOVL mode of aircraft operation;

FIG. 15 is a schematic view in perspective of the rotary drum/twin duct offtake of FIG. 13 illustrating the normal flight aircraft operation.

FIG. 17 is a schematic view in perspective of the rotary drum/coannular offtake of FIG. 16 when in the STOVL aircraft mode of operation;

FIG. 18 is a schematic view in perspective of the rotary drum/coannular offtake of FIG. 16 when in the normal flight aircraft operation;

DETAILED DESCRIPTION OF THE PREFERRED EMBODIMENT

Figure 1:
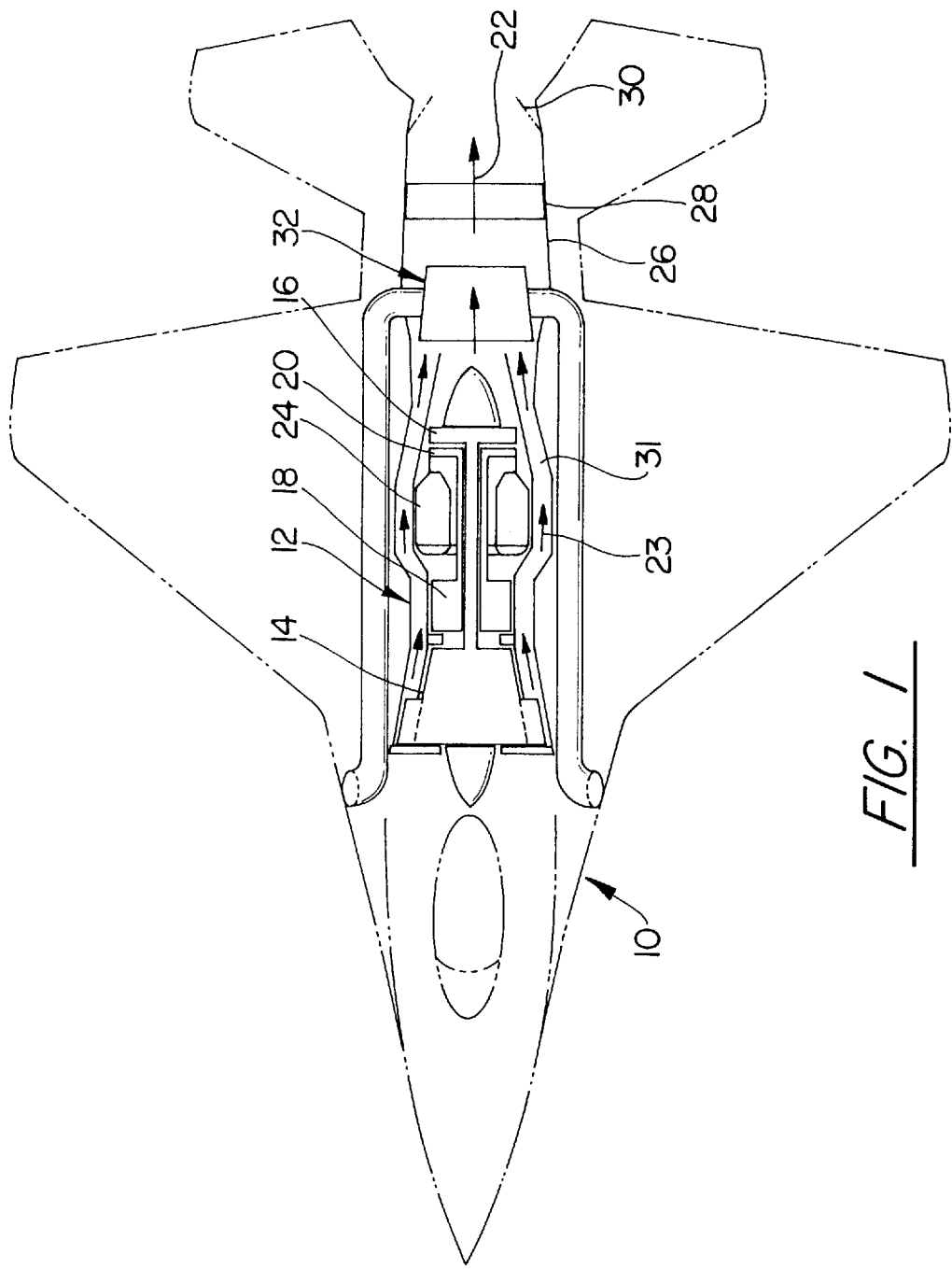
FIG. 1 is a schematic view of a STOVL aircraft with a turbo jet engine utilizing the invention to divert the core engine flow for STOVL operation, vane blockers and variable exhaust nozzle.

While this invention is shown in the preferred embodiment as being utilized in a STOVL type of aircraft it is to be understood that this invention has utility for other types of aircraft and may also be utilized in typical aircraft for thrust reversing. FIG. 1 schematically discloses the STOVL aircraft generally indicated by reference numeral 10 powered by the turbo jet engine generally indicated by reference numeral 12. The engine 12 may be of the twin spool type having the fan/low pressure compressor 14 driven by the low pressure turbine 16 and the high pressure compressor 18 driven by the high pressure turbine 20. The high pressure core stream 22 discharging from the high pressure compressor is fed into the combustor 24 where it is combusted with the fuel admitted thereto as is typical in engine operations. A portion of the energy of the heated and accelerated gasses or engine core discharging from the combustor 24 powers the high pressure turbine 20 and low pressure turbine 16 and the remaining energy from the core stream serves to power the aircraft in the form of thrust. The core stream 22 discharging from the turbines passes in an axial direction through the rotary drum 32 of this invention, the afterburner 26, the normally opened vane blockers 28 and the normally opened variable exhaust nozzle 30 and discharges into ambient in the normal forward flight aircraft operation. The fan air stream 23 discharging from the fan portion of the fan/low pressure compressor 14 flows in the annular by-pass duct 31 and a portion is utilized for cooling of engine components as will be described hereinbelow.

In STOVL flight either the vane blocker 28 or the variable exhaust nozzle 30 can be utilized to block the core stream and the core stream is diverted to pass through the offtakes as will be described hereinbelow. The portion of the fan discharge air 23 is utilized to cool the engine components throughout the entire engine and a portion of the fan discharge air 23 in the STOVL mode is used to cool the offtakes as well as will be described in more detail hereinbelow. Since the aircraft, the engine, the vane blockers and exhaust nozzles are well known mechanisms and do not form a part of this invention they will not be described herein. Typical turbo fan engines like the F-100, F-119 and TF-30 with augmentors are manufactured by Pratt & Whitney division of United Technologies Corporation, the assignee common to this patent application are examples of engines that may utilize this invention.

Figure 2:
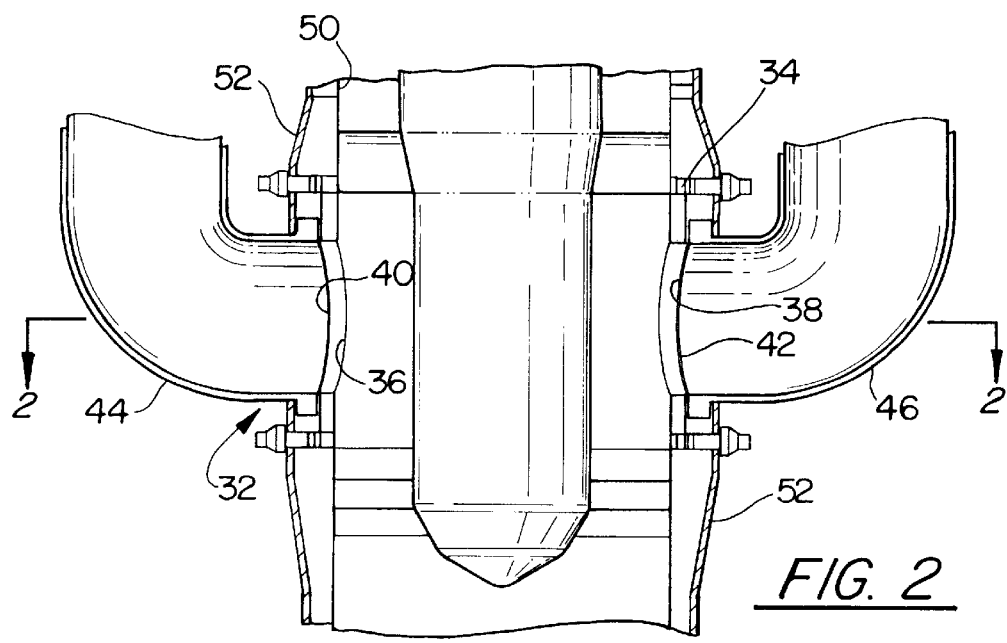
FIG. 2 is a partial view in section and schematic of a gas turbo fan engine illustrating the rotating drum of this invention being utilized on a STOVL twin duct offtake.

For an understanding of this invention reference is now made to FIGS. 2–15 where FIG. 2 shows a portion of the gas turbine engine 12 including the rotating drum assembly generally indicated by reference numeral 32 that is disposed between the turbines 16 and afterburner 26. The shell 34 of the rotating drum assembly 32 is hollow and generally cylindrical in shape and includes a pair of diametrically opposed discharge ports 36 and 38 configured to complement the openings 40 and 42 respectfully formed in the twin offtake ducts 44 and 46 serve to divert the core flow 22 from the engine and a portion of the fan discharge air flow 23 flowing in the annular passage 48 formed between the turbine case 50 and engine case 52. Shell 34 includes an inner shell portion or liner 54 concentrically disposed relative to the outer concentric portion 34 that are coextensive from the outer diameters of the ports 36 and 38 for defining the annular passage 56. A fixed annular portion or liner 58 is suspended from the inner diameter of the engine case 52 to define the annular passage 60.

Figure 3:
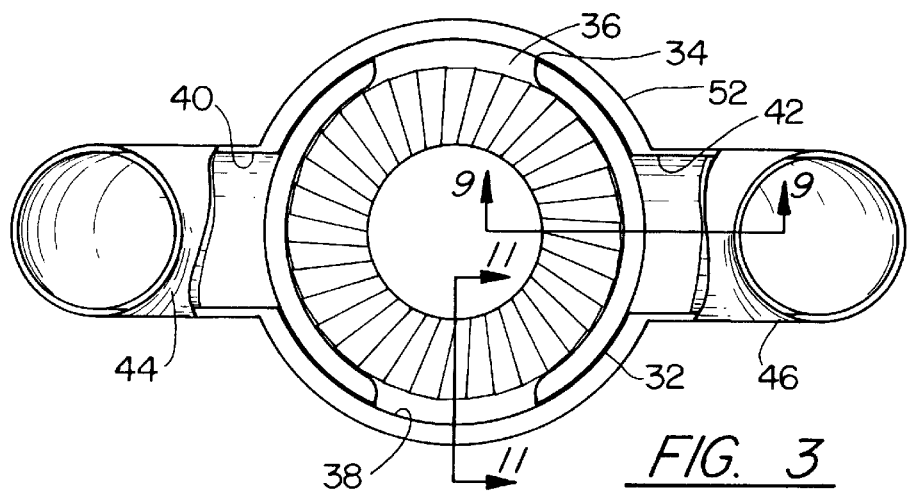
FIG. 3 is a section taken along lines 2—2 of FIG. 2. and is in the normal engine flow operation.
Figure 4:
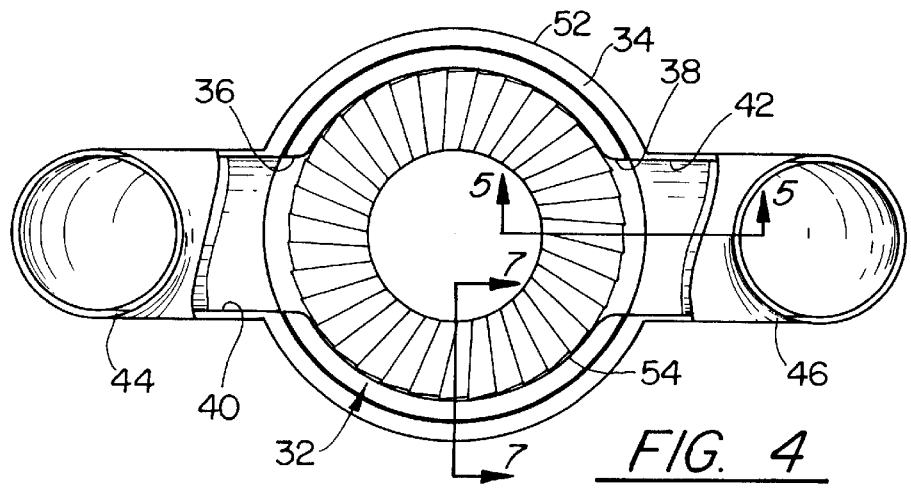
FIG. 4 is a section taken along lines 2—2 of FIG. 2 illustrating the STOVL operation.

As shown in FIG. 3 the rotary drum 32 is in the forward flight position and in FIG. 4 the rotary drum is rotated 90 degrees and in the STOVL mode of operation. Rotating shell 34 is accomplished by the controller shown in blank by reference numeral 62 that serves to control actuator 64 that drives gear 66 via shaft 67 which, in turn, drives a plurality of rotary geared rollers 68. An identical drive mechanism is located at the aft end of the shell 34 which includes the gear and geared rollers also driven by shaft 67. Rollers 68 are disposed around the circumference of shell 34 and the number of rollers required are predicated by the particular embodiment. The controller 62 can take the form of any well known control and actuator mechanism may utilize electrical, electronic, hydraulic or mechanical medium recognizing that the control serves to rotate the rotary drum to any position in order to effectuate the envelope of aircraft operation. For the purposes of this description the apparatus is shown in two modes, namely, 1) forward flight with the offtakes blocked off and 2) STOVL flight with the rotary drum rotated to divert the core stream to the offtakes.

Figure 5:
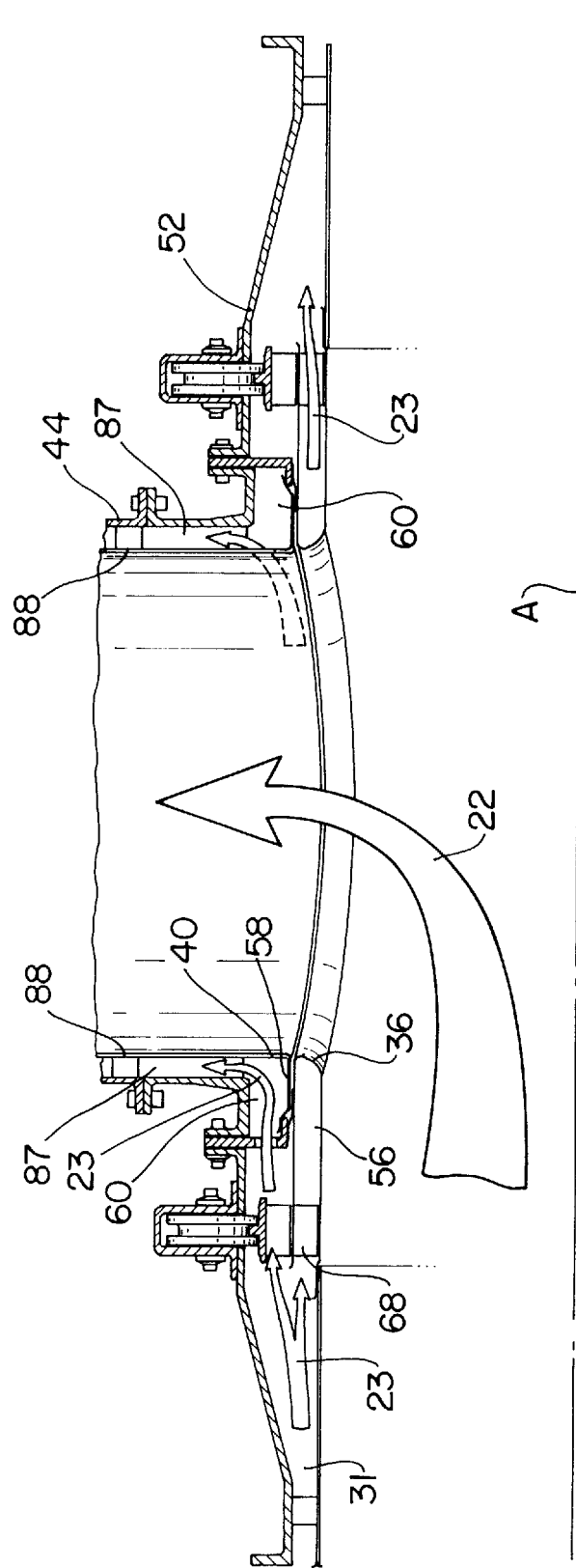
FIG. 5 is a section taken along lines 5—5 of FIG. 4 illustrates the flow pattern through the engine and one of the offtakes.
Figure 6:
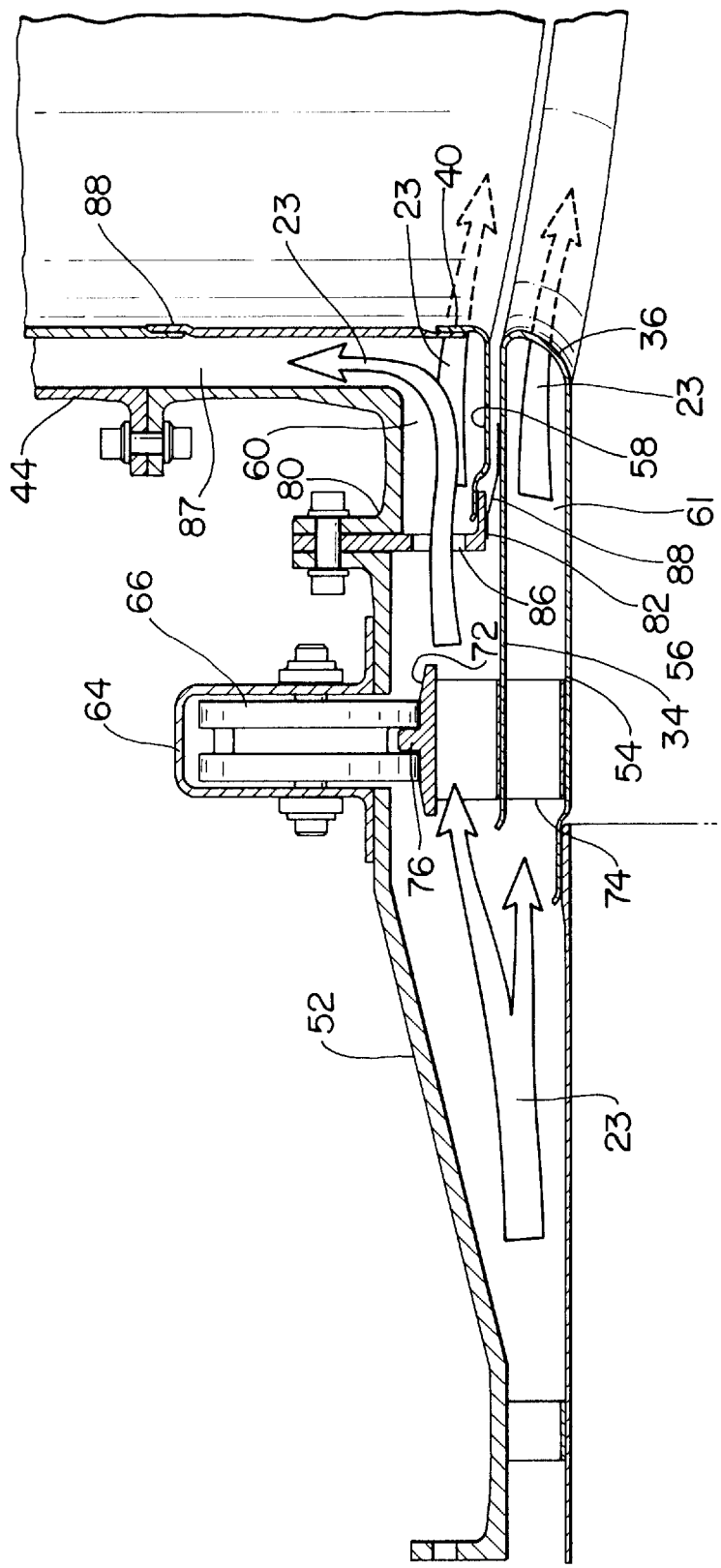
FIG. 6 is an enlarged sectional partial view of FIG. 5 illustrating the flow pattern of the fan discharge air.

As is apparent from FIGS. 2–12 and particularly FIG. 6 the rollers 66 support the shell 34 for rotary motion via the annular drive member 72 affixed to the plurality of Z-shaped spacers 74 circumferentially spaced about the engine axis A and mounted between the engine case and shell 34. The Z-shaped spacers are well known devices and are commonly used to support the liners in the afterburner. Rollers 66 include a bifurcated portion that provide clearance over gear teeth on member 76 that support the shell 34 for rotary motion about the engines axis A.

FIG. 5, 6 and 14 traces the flow paths of the core stream and fan streams during the STOVL aircraft operation. As seen in FIG. 5 the core stream 5 is diverted so that all the flow is through the openings 36 and 40 into the offtake ducts. The fan stream 23 in the passage 31 flows between the Z-shaped spacers and separates into two portions. One portion of the flow passes through passage 60 defined between the engine case 52 and shell 34 and a plurality of openings formed in the valve plate 80 and the remaining portion flows through passage 56 formed between shell 34 and liner 54. Valve plate 80 is a tyroidally shaped disk that is rigidly attached to the engine case 52 and abuts liner 58. The valve plate 80 is a disk shaped member with a flange 82 abutting the liner 58. The term engine case 52 as used throughout this disclosure refers to the modular construction that comprises a plurality cases. Each of the cases are circular in cross section and carry flanges that abut adjacent cases and held together by a plurality of circumferentially spaced nuts and bolt assemblies 84 that define the overall case.

As noted, the end of disk 80 is sandwiched between case flanges and secured by the nut and bolt assemblies. The holes or apertures 86 may take the form of slots or circular holes and serve as valve openings and cooperate with blocker doors to be described herein below. The fan air 23 then flows between the liner 58 and case 52 into the annular passage 60.

The end of liner 58 which is preferable made from sheet metal is faired at the edge adjacent the ports 36 and 38 to form a smooth aerodynamic transition for the flow of fan air into the annular passage 87 defined by the liners 88 which is concentric to and spaced from the offtake ducts 44 and 46. A finger seal 88 is attached to the shell 34 to prevent the fan air to leak into the core stream via the space between the shell and engine liner.

As is apparent from the foregoing the cooler fan air (relative to the temperature of the core stream) serves to maintain the offtake ducts cool and within their structural integrity when the hot engine core air flows therethrough. A portion of the fan air 31 flows into passage 60 formed between the liner 54 and shell 34 and around ports 36 and 40 to the back side and through the annular passage 86 as best seen in FIG. 5. The remaining portion of the fan air flows through passage 56 around the ports 36 and 38 and downstream of the engine so as to cool these components and maintain the structural integrity thereof.

FIGS. 7 and 8 trace the flow path of the fan air when the aircraft is in the STOVL mode of operation and the ports 36 and 38 and 40 and 42 are in alignment. The fan air 23 flows through the shell 34 via the passage 56 and discharges from the shell into the aft portion of the engine. This fan air obviously serves to cool the components of the engine located downstream of the shell 34. The flow in passage 60 is blocked by the blocker doors 90 that are supported by the retainer 92 affixed to the bracket 94 that is attached to the outer surface of shell 34. The blocker doors 90 are circumferentially spaced around the shell 34 and span the distance of the slot 86 of the valve plate 80. The judicious location of the passages in the shell and engine case and the valving arrangement of this invention assures that the fan air does not commingle with the core air and vice versa in all modes of operation. It is important that for assuring ultimate engine performance the fan air is not commingled so that the cooling effectiveness of the fan air will not result in a deficit. The amount of fan air utilized for cooling is precalculated for maximum engine performance and if the cooling air is infected by the core stream and its heat content is raised, the cooling effectiveness will obviously be adversely affected.

The blocker doors 90 are preferably fabricated from carbon or an alloy thereof and is spring loaded by wave spring 96 against the face of the valve plate 80. The opposite end of the wave spring 96 is grounded to the spring retainer 92. The face of the carbon blocker doors easily slide against the face of the valve plate when the shell 34 which carries the blocker doors, is rotated.

FIGS. 9, 10, 11 and 12 trace the flow paths of the core stream and fan air stream when the aircraft is in normal forward flight mode of operation and the ports 36 and 38 and 40 and 46 are not in alignment. Obviously, the core stream flows straight through the shell 34 and is directed to the exhaust nozzle for developing forward thrust. In this mode of operation all of the fan air is directed through passages 56 and 60 through the rotary drum 32 to cool the aft portion of the engine. The flow in the portion of passage 60 in proximity to ports 40 and 42 as evidenced from FIGS. 9 and 10 is blocked by the blocker doors 90. However, as is seen in FIGS. 11 and 12 a portion of the fan air is directed into a portion of passage 60 where it directed downstream of the rotary drum 32 to contribute to the cooling of the engine components. As is evidenced in FIG. 12 the flow of fan air in passage 56 is routed around the ports 40 and 42 to continue the flow path to the downstream end of the engine.

For the purpose of the description of this invention the passage 60 is annular in shape and the slots 86 in cooperation with the blocker doors 90 determine the portion of the annular passage 60 is utilized to flow the fan air. This aspect of the invention will be better understood in connection with the description of FIGS. 13–15, described immediately herein below.

As can be seen in FIGS. 13–15 the rotary drum 32 which is rotatably mounted about the engine's center line A and concentrically mounted relative to the engine case 52 in proximity to the offtakes serves to divert the normally axially flowing core stream and a portion of the normally axially flowing fan air. Like reference numerals depict like elements in all of the Figures. The embodiment schematically shown in perspective in FIGS. 13–14 is substantially the embodiment disclosed in FIGS. 1–12 except for the mechanism schematically illustrating the mechanism for effectuating rotary motion of the rotary drum 32. In this instance schematically shown is a rotating pulley or sprocket gear 100 that drives the chain or belt 102 that in turn drives the shell 34 which may have a mating sprocket gear (not shown). As noted the rotary drum 32 includes the shell 34 and liner 54 and the ports 40 and 42 adapted to align with the twin offtake ducts 44 and 46. The liner 54 which is concentrically disposed relative to the shell 34 defines the annular passage 56. The liner is suspended from the shell 34 and rotatable therewith by the connection obtained by the interconnecting contoured insert 104 that also serves to prevent the core stream to migrate into the fan air stream. In addition it provides a transition in passage 56 to flow the fan stream around ports 40 and 42.

The engine case 52 including the offtake ducts 44 and 46 includes the concentric liner 58 spaced therefrom and supported by the circumferentially spaced ribs 106. The annular space defines the passage 60. It will be appreciated that the spacing of the four (4) ribs define four (4) quadrants which are the portions of the passage 60 that are opened and blocked in order to direct a portion of the fan air in the annular passage 87 (see FIGS. 5 and 6). For the sake of simplicity and convenience the valve plate 80 is removed from the FIGS. 13–15 as well as 16–18 to facilitate the understanding of this invention. The valve plate 80 would be mounted to abut the face of the case 52 as shown in FIGS. 13–18 and the slots would coincide with the sub-passages (space between adjacent ribs) in annular passage 60.

The flow patterns of the core stream and fan air streams for STOVL operations and forward flight (cruise) operations are depicted in FIGS. 14 and 15. As noted the core stream A is diverted through the offtakes 44 and 46 by virtue of the position of shell 34 of the rotary drum 32. A portion of the fan air C flows straight through the shell 34 by way of passage 56. The remaining portion of the fan air flows in the sub-passages of passage 60 that are in the quadrants adjacent the ports 40 and 42 leading the fan air B into the annular passage 87. As note the inserts 104 define the contour of passage 60 adjacent the ports and define a transition passage for the fan air to flow from the passage 60 into the passage 87 of the offtake ducts 44 and 46. The blocker doors 90 are in position to block the flow from the sub-passages of passage 60 that are in the quadrants remote from the ports 40 and 42.

In the forward flight mode as shown in FIG. 15, the rotary drum 32 is rotated 90 degrees to position ports 40 and 42 out of alignment with the offtake ducts 44 and 46. In this instance, the blocker doors 90 are placed in the quadrant that includes the offtakes 44 and 46 so that the core flow D flows axially through the rotary drum 32. The fan air portion E flows through the sub-passages of passage 60 and the remaining portion F flows through passage 56.

As is apparent from the foregoing the flow of the core stream and the flow of the fan stream in all modes of engine and aircraft operation are maintained separate. It will be appreciated that when in the STOVL mode of operation either the vane blockers 28 or the exhaust nozzle 30 are in the close position so as to divert the core stream. It is to be understood that in certain modes of operation it may be desired to proportion the core stream so that only a portion is diverted. This could easily be controlled by the controller 62 (FIG. 7) which would position the rotary drum and the exhaust nozzle or vane blockers to control the amount of flow being diverted.

Figure 16:
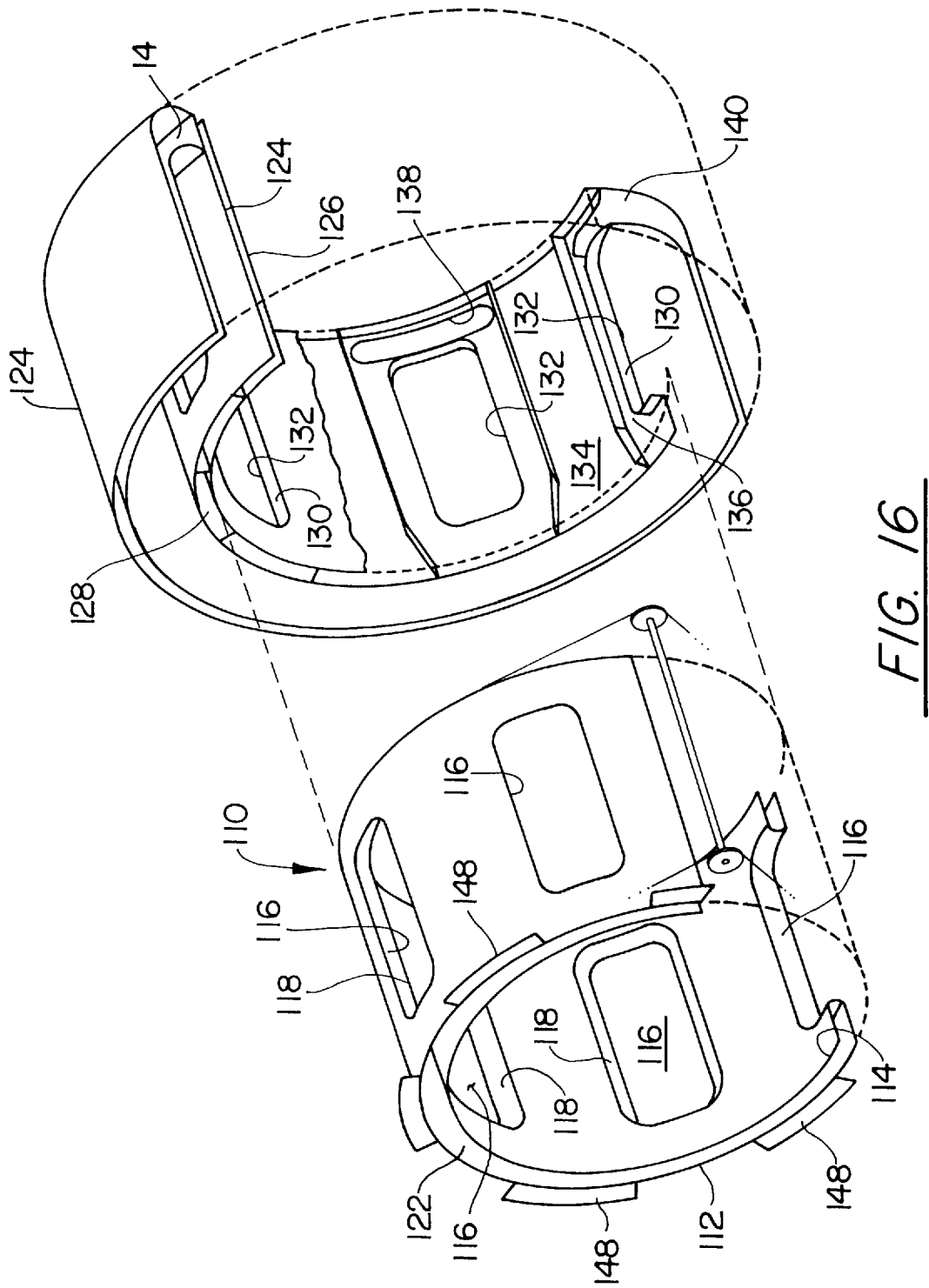
FIG. 16 is an exploded view in schematic illustrating a rotary drum for diverting core engine flow to a coannular offtake for a STOVL aircraft.

FIGS. 16–18 exemplify another embodiment of this invention where coannular offtakes are utilized as opposed to the twin duct offtakes depicted in FIGS. 1–15. The schematic illustrations of FIGS. 16–18 show the rotating drum 110 having concentrically disposed shell 112 and liner 114 with a plurality of circumferentially spaced ports 116. The contoured inserts 118 support the liner to the shell 112 and both rotate together. The space between the liner 114 and shell 112 define the annular passage 122 and the inserts 118 form transition surfaces to guide the flow around the respective ports 116 so as to assure that the fan stream is maintained separate from the core stream.

The engine case 124 and liner 126 as shown in FIG. 16 are concentrically disposed and spaced to define the annular passage 128 and are supported by the ribs 130 extending axially through the case 124 and the inserts 130 contoured around the openings 132. As best seen in this Fig. the annular passage 126 is divided in sub-passages 134 and 136. Sub-passages 134 are axially aligned passages that extend straight through and sub-passages 136 adjacent each of the openings 132 lead the flow around the openings 132 into slots 138 formed on the aft side of the openings 132 and are in communication with the passage 140 formed between the annular offtake 142 and the offtake liner 144 parallel to and spaced therefrom.

In STOVL mode of operation the ports 116 align with the apertures 132 for diverting the core stream A from the rotary drum into the coannular offtakes 124 via the ports 116 and apertures 132. The blocker doors 148, similar in design to the blocker doors 90 depicted in FIGS. 7 and 8 block the sub-passages 134 leaving sub-passages 136 exposed to the fan air stream. Hence a portion of the fan air stream B is directed into sub-passage 136 and is transitioned into the passage 140 to maintain the coannular offtake 124 within the structural integrity of the material. The remaining portion of the fan air C flows through passage 122 axially through the rotary drum 110 to cool the downstream engine components. Similar to the operation of the twin duct offtake configuration the engine's exhaust gas discharging from the exhaust nozzles is completely or partially blocked off depending on the mode of aircraft operation.

In the forward flight or cruise aircraft mode of operation the rotary drum is rotated to place ports 116 out of alignment with the openings 132 and the core stream D flows axially through the rotary drum 110 to be discharged through the exhaust nozzle. In this mode of operation the blocker doors 148 block the flow in sub-passages 136 and expose sub-passages 134 so that the portion of the fan air E flows straight through the rotary drum 110 through sub-passages 134. The remaining portion of the fan air flows through the annular passage 122 to cool the downstream components of the engine.

What has been shown by this invention is a relatively simple structure requiring minimum number of components that divert the fan air flow and core flow separately while assuring that the fan air flow during STOVL mode of operation cools both the offtake ducts whether coannular ducts or twin ducts are utilized and the aft components of the engine.

Although this invention has been shown and described with respect to detailed embodiments thereof, it will be appreciated and understood by those skilled in the art that various changes in form and detail thereof may be made without departing from the spirit and scope of the claimed invention.

It is claimed:

1. A flow diverting system for aircraft powered by a turbo-fan engine and having an offtake including a rotary hollow drum being cylindrically shaped for flowing engine core air through the hollow portion thereof and through ports formed in said rotary hollow drum when the flow of the core air is blocked, means for separating from said core air and proportioning fan air discharging from said fan to cool said offtake and the engine components downstream of said rotary hollow drum and means for rotating said rotary hollow drum to place said ports in fluid communication with said offtake.

2. A flow diverting system as claimed in claim 1 wherein said engine includes a turbine and afterburner, said rotary hollow drum being disposed between said turbine and said afterburner.

3. A flow diverting system as claimed in claim 2 including a first annular passage communicating with said fan for flowing fan discharge air, said engine having a liner disposed in proximity to said offtake and defining a second annular passage, said rotary drum including a cylindrical shell and a liner mounted concentrically to said shell and defining a third passage, said engine having a cylindrically shaped case, valving means disposed between said shell and said case, blocker doors mounted on said shell cooperating with said valving means to open an close a portion of said valving means, said third passage continuously flowing fan discharge air through said rotary hollow drum to cool engine components located downstream thereof, and said blocker doors selectively opening and closing a portion of said second passage to flow fan discharge air to said offtakes solely when said ports are diverting flow into said offtake.

4. A flow diverting system as claimed in claim 3 including a plurality of rollers supported to said case for supporting said shell for rotary movement to connect and disconnect said ports from said offtake.

5. A flow diverting system as claimed in claim 4 wherein said offtake is twin ducts.

6. A flow diverting system for aircraft powered by a turbo fan engine that has short takeoff and vertical lift or thrust reversing operating modes, said engine having core flow of gases for developing thrust, said aircraft having twin duct offtakes having an outer wall and a concentrically disposed liner spaced therefrom to define a first passageway, the improvement comprising a rotary drum mounted for rotation about the engine's centerline, said engine having a cylindrical case and a liner member spaced therefrom defining a second passageway and being disposed adjacent to said offtakes, said rotary drum comprising a cylindrical shell spaced from and concentric to said liner member and being in axial alignment with the core flow for flowing the core flow through the center thereof for forward flight aircraft operations, said shell having a double walled portion defining an open ended passage, ports formed in said shell, said-double walled portion surrounding each of the ports formed in said shell, openings formed in said liner member and said twin duct offtakes, said ports complementing the openings in said liner member and said twin duct offtakes for diverting the engine core stream of working fluid to flow through said ports into said twin duct offtakes and means for proportioning the fan air flow discharging from the fan of said engine for flowing a portion of the fan air through said open ended passage into said first passageway and for flowing a portion of said fan air through said second passageway downstream of said rotary drum to the engine components located downstream of said rotary drum whereby said fan air and working fluid are maintained separate from each other and means for controlling the rotation of said rotary drum.

7. A flow diverting system as claimed in claim 6 for permitting the working fluid medium of said engine and fan discharge air to flow straight through said engine during forward flight of the aircraft and divert the working fluid medium and a portion of the fan discharge air to flow through said offtakes during short takeoff and vertical lifts or thrust reversing modes of operation.

8. A flow diverting system as claimed in claim 7 wherein said rotary drum is disposed between the turbine section and the afterburner section of said engine.

* * * * *